United States Patent [19]
Maruyama et al.

[11] Patent Number: 5,375,211
[45] Date of Patent: Dec. 20, 1994

[54] BUS ERROR PROCESSING SYSTEM HAVING DIRECT BUS MASTER/CPU COMMUNICATION

[75] Inventors: Takashi Maruyama, Yokohama; Keiichi Kurakazu, Tachikawa; Susumu Kaneko, Kodaira; Hiroyuki Kida, Hitachi, all of Japan

[73] Assignee: Hitachi, Ltd., Tokyo, Japan

[21] Appl. No.: 774,640

[22] Filed: Oct. 11, 1991

Related U.S. Application Data

[63] Continuation of Ser. No. 230,059, Aug. 9, 1988, abandoned.

[30] Foreign Application Priority Data

Aug. 25, 1987 [JP] Japan ................ 62-211186
Jun. 29, 1988 [JP] Japan ................ 63-161884

[51] Int. Cl.⁵ .............................. G06F 13/32
[52] U.S. Cl. ...................... 395/325; 364/DIG. 1; 364/232.8; 364/241.2; 364/242.92; 364/265.3; 364/280.8
[58] Field of Search .................. 395/325, 575, 725

[56] References Cited

U.S. PATENT DOCUMENTS 4,727,477 2/1988 Gavril .................... 364/200

FOREIGN PATENT DOCUMENTS 58-71173 11/1984 Japan .
60-183657 9/1985 Japan .

OTHER PUBLICATIONS

MC68020 32-Bit Microprocessor User's Manual by Motorola Inc., 1984, pp. 5-42-5-46, 6-5-6-16, 8-3, 8-12, 8-13, 8-25-8-34.
CMOS 16-Bit MPU and DMAC, Y. Suzuki, et al., Hitachi Review, vol. 35, No. 5, Oct. 1986, pp. 241-246.
The SCC68070: a monolithic 68000 CPU and peripherals, G. Conn, Electronic Components & Application, vol. 8, No. 2, 1987, pp. 95-100.
Motorola M68000 8-/16-/32-Bit Microprocessor User's Manual, seventh edition, pp. 5-1-6-9.
Signetics, SCC68070, objective specification, p. 10, published Dec., 1985.

*Primary Examiner*—Gareth D. Shaw
*Assistant Examiner*—Kakali Chaki
*Attorney, Agent, or Firm*—Fay, Sharpe, Beall, Fagan, Minnich & McKee

[57] ABSTRACT

A bus error ascribable to a bus master module other than a central processing unit (CPU) is set as a specified factor for an exception process. When the exception process is requested, the CPU carries a corresponding service program for the exception process into execution without executing a process for altering and setting mask bits as is executed for an interrupt request. Thus, the exception process request specific to the bus error is not undesirably refused by the interrupt request etc. accepted before the bus error, and besides, a period of time which is expended before the start of the run of a service program corresponding to the bus error is shortened, with the result that the reliability of the process for the bus error attributed to the predetermined bus master module other than the CPU is enhanced.

25 Claims, 3 Drawing Sheets

BUS ERROR PROCESSING SYSTEM HAVING DIRECT BUS MASTER/CPU COMMUNICATION

This is a continuation of copending application(s) Ser. No. 07/230,059, filed on Aug. 9, 1988, now abandoned.

BACKGROUND OF THE INVENTION

The present invention relates to a system for processing the error of a bus cycle system (a bus error). By way of example, it relates to a technique which is effective when applied to a bus error process in a single-chip microcomputer that includes a CPU (central processing unit) for supporting a bus error and also another bus master module such as a DMAC (direct memory access controller).

In a single-chip microcomputer having built-in bus master modules such as a CPU and a DMAC, when a bus error has occurred in a bus cycle in which the bus master module other than the CPU starts, it can be coped with in such a way that the pertinent bus master module requests the CPU to execute an interrupt process corresponding to the bus error.

Here, the bus errors occur on such occasions that an address area in which a peripheral circuit or the like is not actually mapped has been accessed, and that the access of a user status is done to a memory area or peripheral device in which a supervisor status is set.

Heretofore, the bus error ascribable to the bus master module other than the CPU has been transacted by the process of interrupt into the CPU as described in, for example, "Signetics, SCC68070, objective specification," p. 10, published in December 1985. By way of example, when a bus error has occurred in the bus cycle of a DMAC, the DMAC ends a direct memory access operation and sets a bus error status upon the detection of the bus error. Thereafter, the DMAC releases a bus mastership and applies an interrupt signal to an interruption controller. The interruption controller gives the CPU an interrupt request for a bus error process within a range allowed according to an interrupt priority level and interrupt mask information. Thus, the CPU verifies the bus error status of the DMAC in accordance with a predetermined interrupt response cycle and runs a service program specific to the bus error process.

SUMMARY OF THE INVENTION

In general, there are a plurality of sorts of factors of interrupts, and the various interrupts have their priority levels set beforehand in accordance with the degrees of importance of the factors. For this reason, in a case where an interrupt having a priority level higher than that of an interrupt specific to a bus error has been accepted earlier or where the interrupt for the bus error competes with such another interrupt request, an interrupt process for the bus error is rejected and postponed. It is supposed that the bus error is set as a non-maskable interrupt factor in advance. Even in this case, when an exception process or a non-maskable interrupt assigned to another factor has been accepted earlier, an interrupt request the priority level of which is lower than that of the process accepted earlier is refused to be accepted, with the result that the interrupt process for the bus error is similarly left undone in some cases. It has accordingly been revealed by the inventors that, when the bus error ascribable to a bus master module other than a CPU is processed by the interrupt into the CPU, the reliability of the operation of a system might degrade drastically in such a case where the bus cycle of the DMAC or the like is as important as that of the CPU in point of the system operation.

Moreover, even when the interrupt request for the bus error has been accepted by the CPU, the start of the run of a service program for the bus error transaction must be preceded by the decisions of the interrupt factor and the priority level and also by the alteration of the setting of interrupt mask bib for thereafter refusing another interrupt request the priority level of which is lower than that of the the interrupt request for the bus error. This poses the problem that a period of time not negligible is required before the start of the substantial run of the service program.

An object of the present invention is to provide a bus error processing system which can enhance the reliability of a process for a bus error attributed to a predetermined bus master module other than a central processing unit.

The above and other objects and novel features of the present invention will become apparent from the description of this specification and the accompanying drawings.

A typical aspect of performance of the present invention is briefly summarized as follows:

A bus error processing system is so constructed that, when a bus master module other than a central processing unit (CPU) has detected a bus error in the bus cycle thereof, it requests the CPU to execute an exception process specific to the bus error, and that, in compliance with the request for the exception process, the CPU starts the run of a service program corresponding to the exception process without executing a mask bit-altering process which is executed for an interrupt request.

According to the present invention; the bus error ascribable to the bus master module other than the CPU is set as the specified factor of the exception process for the CPU. In compliance with the exception process request, the CPU starts the run of the service program corresponding to the exception process without executing the process for altering and setting mask bits as is executed for the interrupt request. Thus, the exception process request specific to the bus error is hindered from being undesirably refused by the interrupt request or the like accepted before the bus error, and besides, it becomes possible to shorten the period of time which is expended before the start of the run of the service program corresponding to the exception process. Accordingly, even when the bus master module other than the CPU requests the bus error exception process during the execution of another exception process or the interrrupt process by the CPU, the request for this bus error exception process is not hampered and refused by the interrupt process or the other exception process being already executed, and the execution of the exception process for the bus error of the other bus master module can be preferentially started.

The period of time which is expended since the bus error exception process request of the other bus master module till the start of the run of the corresponding service program can be rendered shorter than in case of processing the bus error with an interrupt process.

Consequently, even in a case where a data transfer operation by the other bus master module is as important as the bus cycle of the CPU in point of the operation of a system, such a process for the bus error of the other bus master module is executed by the exception process likewise to a process for the bus error of the CPU, with the result that the reliability of the system operation can be enhanced.

Further, in processing that bus error of the other bus master module which has occurred when the CPU has given a bus mastership to the other bus master module in the course of the execution of an instruction, the CPU acquires the bus mastership upon such occurrence of the bus error of the bus master module and executes the rest process of the instruction, and it thereafter accepts the exception process request, whereby a halfway process executed by the CPU can be prevented from wasting.

In addition, when the request for the exception process specific to the bus error of the other bus master module is applied through a dedicated signal line to the dedicated terminal of the CPU assigned to this request by, for example, forming the CPU and the other bus master module on an identical semiconductor substrate, the CPU need not analyze the exception process request, thereby making it possible to more shorten the period of time which is expended until the service program for the exception process for the bus error of the bus master module is carried into run.

DESCRIPTION OF THE PREFERRED EMBODIMENT

Figure 1:
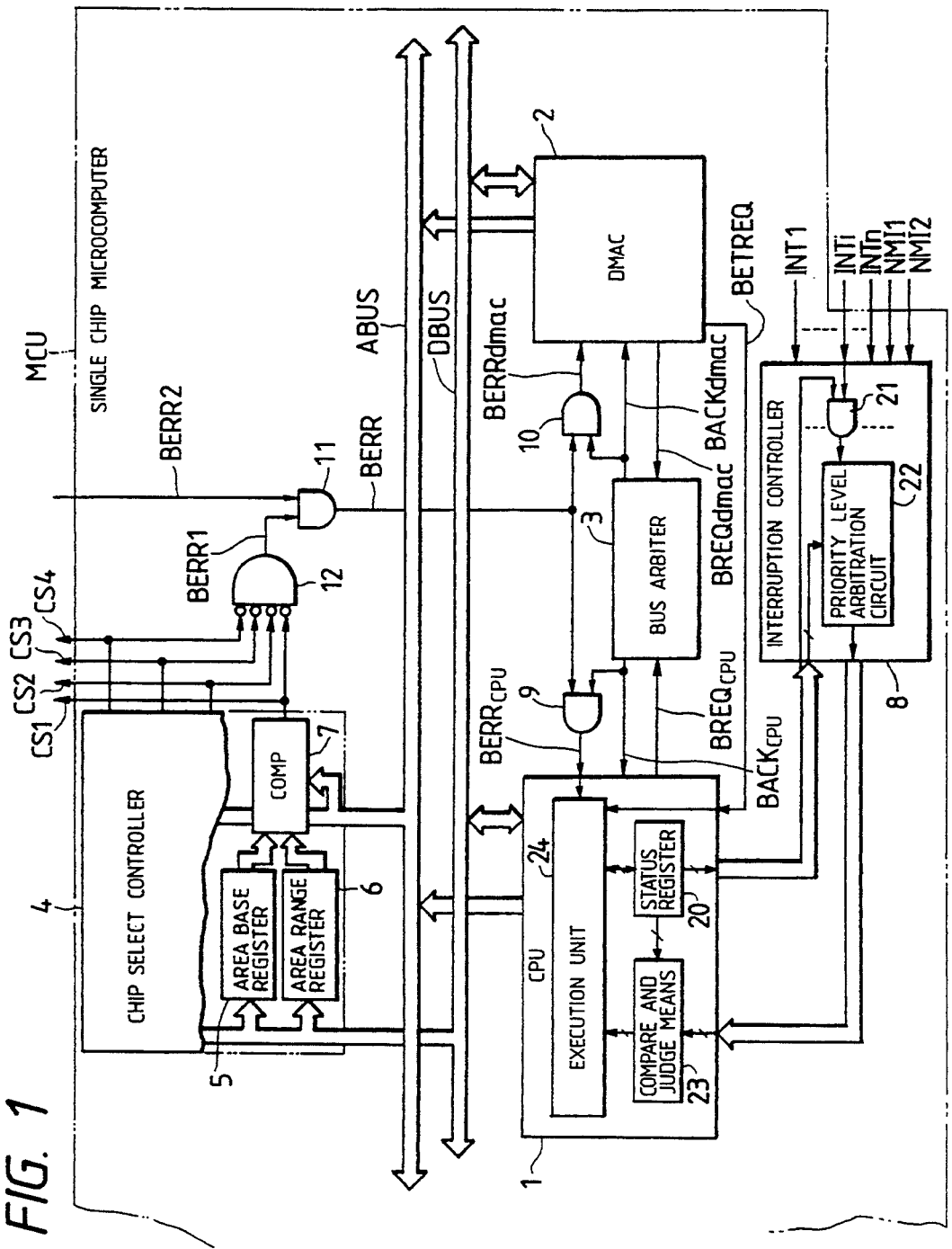
FIG. 1 is a block diagram of an embodiment of a single-chip microcomputer according to the present invention.

Shown in FIG. 1 is a single-chip microcomputer which is an embodiment of the present invention. Although not especially restricted, the single-chip microcomputer MCU depicted in the figure is formed on a single semiconductor substrate by known techniques for manufacturing semiconductor integrated circuits.

The single-chip microcomputer MCU shown in FIG. 1 includes a CPU (central processing unit) 1 which is coupled to an address bus ABUS and a data bus DBUS. Further, as an example of bus master modules other than the CPU, it includes a DMAC (direct memory access controller) which is coupled to the address bus ABUS and the data bus DBUS. Incidentally, although not shown, bus slave modules such as a program memory for storing a program and an input/output circuit are coupled to the address bus ABUS and the data bus DBUS.

Although no special restriction is meant, the CPU 1 includes a general register, a program counter, a status register, an arithmetic-logic unit, etc., and it fetches instructions principally from the unshown program memory and executes predetermined data processes in succession.

On the basis of bus cycles started by itself, the DMAC 2 transfers a data block between memories and also transfers data between it and a disk controller, a communication interface controller, etc. in conformity with a cycle-stealing system or a burst system.

According to this embodiment, a bus arbiter 3 arbitrates a bus mastership between the CPU 1 and the DMAC 2. The bus arbiter 3 arbitrates a request for the bus mastership on the basis of a bus request signal $BREQ_{cpu}$ delivered from the CPU 1 and a bus request signal $BREQ_{dmac}$ delivered from the DMAC 2. It gives the bus mastership to the CPU 1 by asserting a bus acknowledge signal $BACK_{cpu}$, and to the DMAC 2 by asserting a bus acknowledge signal $BACK_{dmac}$. Although not especially restricted, the bus request signals $BREQ_{cpu}$ and $BREQ_{dmac}$ and the bus acknowledge signals $BACK_{cpu}$ and $BACK_{dmac}$ have a high level set as the request level and acknowledge level thereof, respectively.

In FIG. 1, numeral 4 indicates a chip select controller, which is a circuit that forms chip select signals for selecting peripheral circuits allocated to an address space to be managed by the single-chip microcomputer MCU. Although not especially restricted, the chip select controller 4 forms four chip select signals CS1-CS4 each having a high level as its select level. Each of the chip select signals is directed to one set consisting of an area base register 5, an area range register 6 and a comparator 7. By way of example, the start address of an address area allocated to one predetermined peripheral circuit is set in the area base register 5, while the range of the address area allocated to the predetermined peripheral circuit is set in the area range register 6. The comparator 7 compares an address on the address bus ABUS with addresses within the range designated by the area base register 5 as well as the area range register 6, and it brings the corresponding chip select signal to the select level (high level) when the address on the bus is included within the range. Incidentally, in a case where five or more peripheral circuits are mapped in the address space managed by the single-chip microcomputer MCU, a decoder which decodes address signals outside the microcomputer MCU so as to form chip select signals is further required. Besides, in a case where the chip select signals CS1-CS4 are delivered outside the microcomputer MCU, they can be directly transferred out. Alternatively, the chip select signals are once encoded into 2-bit signals inside the microcomputer MCU so as to externally supply these 2-bit signals, and outside the microcomputer MCU, the supplied signals are decoded into 4-bit signals, which can be utilized.

In FIG. 1, numeral 8 indicates an interruption controller, which is supplied with various interrupt signals NMI1, NMI2, and INT1-INTn from predetermined peripheral circuits disposed inside and outside the single-chip microcomputer MCU. In this embodiment, the interrupt signals NMI1 and NMI2 are so-called non-maskable interrupt signals and are given the highest priority level in the various interrupt signals. In contrast, the interrupt signals INT1-INTn are maskable interrupt signals, and they are given priority levels which lower successively in the order mentioned. Information items on the priority levels are held in the CPU 1.

The status register 20 of the CPU 1 retains interrupt enable bits and interrupt mask bits as control information for interrupt requests. The interrupt enable bits are used as mask information in the case where, even when the interrupt requests have been issued, they are not to be given to the CPU 1 for reasons of the generation sources thereof, and they can be set in one-to-one correspondence with the interrupt signals INT1-INTn. In a case where, during the execution of an interrupt process or the like by the CPU 1, another interrupt request has been made, the interrupt mask bits are used as mask information for determining whether or not the later interrupt request is accepted. These interrupt mask bits can be respectively set in one-to-one correspondence with the various interrupt signals NMI1, NMI2, and INT1-INTn.

When an interrupt is requested from inside or outside the microcomputer MCU by any of the interrupt signals NMI1, NMI2, and INT1-INTn, the interruption controller 8 decides whether or not an interrupt enable bit corresponding to the interrupt signal is enabled, through a logical gate 21 illustrated typically. When the interrupt is enabled, the corresponding interrupt request is applied to a priority level arbitration circuit 22. In a case where a plurality of interrupt requests are simultaneously generated, the priority level arbitration circuit 22 arbitrates and controls them according to the predetermined priority levels so as to accept the request of relatively high priority level. The interrupt request having passed through the priority level arbitration circuit 22 is applied to compare and judge means 23 provided in the CPU 1. The compare and judge means 23 judges whether or not the interrupt request applied from the interruption controller 8 is masked by the interrupt mask bit of the status register 20. When not masked, the interrupt request is applied to the execution unit 24 of the CPU 1. Thus, the CPU 1 stores the states of the program counter and the status register 20, and it also alters and sets the interrupt mask bits of the status register 20 so as not to accept new interrupt requests the priority levels of which are lower than that of the accepted interrupt request. Further, the CPU I vectors the start address of a service program conforming to the accepted request and runs the program to execute an interrupt process.

In a case where an interrupt is externally requested by the interrupt signal NMI1 or NMI2, the interrupt mask bit is directly checked by the compare and judge means 23 without the decision of an interrupt enable bit and the arbitration based on the priority levels. Even in the case of the non-maskable interrupt request owing to such an interrupt signal NMI1 or NMI2, a process for altering and setting interrupt mask bits, similar to the foregoing is executed after a process for storing the states, similar to the foregoing. Thus, even when the interrupt request based on the interrupt signal NMI2 is made during an interrupt process based on the other interrupt signal NMI1 by way of example, it is refused to be accepted through the check of the interrupt mask level.

Next, there will be described a construction for a bus error process in the single-chip microcomputer MCU of this embodiment.

Although no special restriction is meant, this embodiment will be exemplified as to the process of a bus error in which a region where no peripheral circuit is actually mapped in the address space managed by the single-chip microcomputer is accessed.

According to this embodiment, in order to detect such bus errors in bus cycles started by themselves, the CPU 1 and the DMAC 2 as the bus master modules are respectively supplied with the output signal of an AND gate 9 which takes the logical product between the bus mastership acknowledge signal $BACK_{cpu}$ and a bus error occurrence signal BERR having its high level set as an error occurrence level, and with the output signal of an AND gate 10 which takes the logical product between the bus mastership acknowledge signal $BACK_{dmac}$ and the bus error occurrence signal BERR, though they are not especially restrictive. Although not especially restricted, the bus error occurrence signal BERR is formed by the output of an AND gate 11 which takes the logical product between bus error occurrence signals BERR1 and BERR2. The bus error occurrence signal BERR1 is the output signal of an AND gate 12 which receives the inverted level signals of the chip select signals CS1-CS4 as its 4 inputs and takes the logical product among them. On the other hand, the bus error occurrence signal BERR2 is a signal obtained by taking the logical product among the inverted level signals of respective output signals delivered from a decoder, not shown, which decodes address signals outside the single chip microcomputer in order to form chip select signals.

Accordingly, in a case where the address signals generated in the bus cycle based on the CPU 1 or the DMAC 2 correspond to the address area having no peripheral circuit actually mapped therein, the bus error occurrence signal BERR is brought to the high level. In a case where such a bus error occurs in the bus cycle started by the CPU 1, this CPU 1 samples the high level output of the AND gate 9 at a predetermined timing, thereby to detect the bus error. On the other hand, in a case where the bus error occurs in the bus cycle started by the DMAC 2, this DMAC 2 samples the high level output of the AND gate 10 at a predetermined timing, thereby to detect the bus error.

A bus error detection signal $BERR_{cpu}$ delivered from the AND gate 9 is assigned as a request for an exception process specific to the bus error of the CPU 1. Accordingly, when the specific exception process is requested by the bus error detection signal $BERR_{cpu}$, the CPU 1 stores the states of the program counter and the status register 20, and it thereafter vectors the start address of a service program assigned to the exception process and runs the program to execute a recover process, a retry process or the like for the bus error.

As soon as the DMAC 2 detects the bus error thereof on the basis of the bus error detection signal $BERR_{dmac}$ delivered from the AND gate 10, it stops a direct memory access operation and asserts a bus error process request signal BETREQ directly to the CPU 1. The bus error transaction request signal BETREQ is assigned as a request for an exception process specific to the CPU 1 concerning the bus error of the DMAC 2. When the specified exception process for the bus error of the DMAC 2 is requested, the CPU 1 stores the states of the program counter and the status register 20 at a predetermined timing after acquiring a bus mastership, whereupon it immediately vectors the start address of a service program assigned to the exception process and runs the program to execute a recover process, a retry process or the like for the bus error.

Here, the exception process of the CPU is given a priority level higher than those of interrupt processes in view of the importance of influence which the factor of the occurrence of the exception process exerts on the system operation. In order to reflect this, a process corresponding to the check of an interrupt mask bit is not executed for the exception process, and a process for altering the setting of interrupt mask bits to be executed for an interrupt request is not performed, either, and after the states are stored, the service program corresponding to the exception process is quickly carried into run. Accordingly, when the exception process for the bus error is requested during the execution of the other exception process or the interrupt process by the CPU 1, the process under execution is interrupted, and the exception process for the bus error is preferentially executed. By the way, in a case where the acceptance of interrupts of lower priority levels is to be refused during the bus error exception process, an instruction which alters the setting of the interrupt mask bits so that all or some of the interrupts may be maskable as needed by the system operation can be included in the service program of the pertinent exception process beforehand. However, even when such an instruction is added, it is not affected at all that the bus error exception process request is not hampered and refused by the interrupt process being already executed or the other exception process, and that a period of time expended since the bus error exception process request till the start of the run of the service program is shortened.

Besides, in processing a bus error which has occurred when the CPU 1 has afforded the bus mastership to the DMAC 2 in the course of the execution of an instruction, the CPU 1 acquires the bus mastership after the occurrence of the bus error of the DMAC 2 and executes the rest process of the pertinent instruction and thereafter accepts a request for the exception process of the bus error lest the process executed halfway by the CPU 1 should waste.

Figure 2:
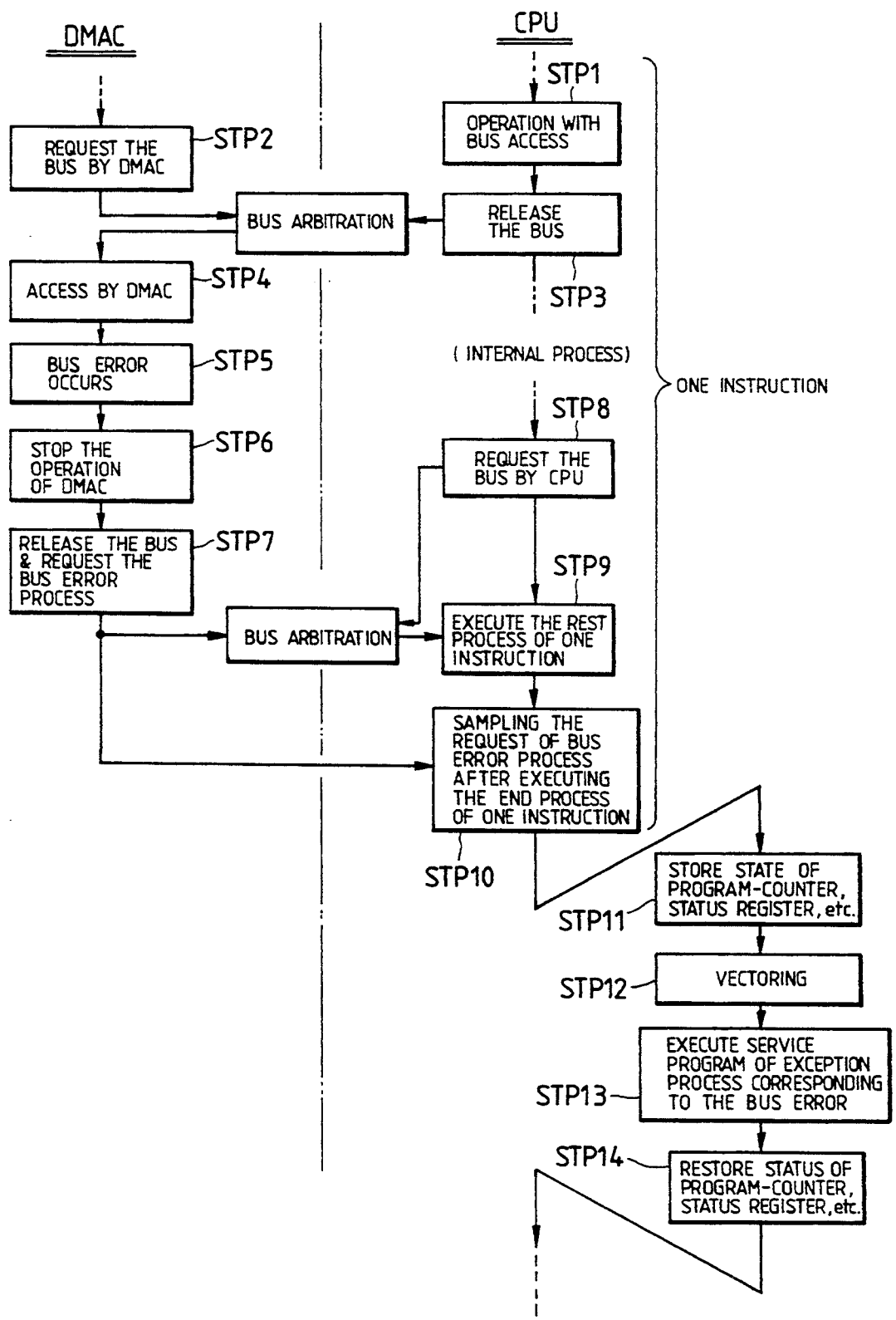
FIG. 2 is a flow chart showing an example of the operation of transacting the bus error of a direct memory access controller (DMAC) at a specified exception process request.

Next, the processing operation of the CPU 1 for a bus error having occurred in the bus cycle of the DMAC 2 in this embodiment will be described by chiefly referring to a flow chart of FIG. 2.

When the CPU 1 is performing an operation with bus access (step STP1), the DMAC 2 requests a bus mastership (step STP2). Then, the CPU 1 once abandons the bus mastership for the purpose of an internal process (step STP3), and the DMAC 2 acquires the bus mastership in response to the abandonment. Thus, the DMAC 2 starts its bus cycle (step STP4). When, on this occasion, a bus error in which the DMAC 2 accesses a peripheral circuit or a memory area not mapped in any address space occurs (step STP5), the bus error detection signal $BERR_{dmac}$ which is output from the AND gate 10 is changed to the high level.

Upon detecting the bus error owing to the change of the bus error detection signal $BERR_{dmac}$ to the high level, the DMAC 2 immediately ends the bus cycle to stop a direct memory access operation (step STP6), and it releases the bus mastership and asserts the bus error process request signal BETREQ to the CPU 1 so as to request a corresponding exception process (step STP7).

On this occasion, the CPU 1 has already ended the internal process and requested the bus mastership by way of example (step STP8). When the CPU 1 acquires the bus mastership owing to the release thereof by the DMAC 2, it executes a rest process in one instruction interrupted halfway from being processed, earlier (step STP9) so as to prevent a previous process from wasting. By way of example, the instruction is assumed to be MOVE instruction. Then, when the CPU 1 has performed a read cycle and once released the bus mastership, resulting in a write cycle left undone, it performs the write cycle. After the CPU 1 has executed the last process in the instruction, it samples the exception process request for the bus error of the DMAC 2 (step STP10).

Thus, the main flow of the CPU 1 is interrupted, and the states of the program counter and the status register 20 on that occasion are stored (step STP11). Immediately, the start address of a service program for the exception process specific to the bus error ascribable to the DMAC 2 is vectored (step STP12), and the run of the service program is started (step STP13). After the end of the run of the service program, the operation of the CPU 1 is returned to the main flow via restoring the states (step STP14).

Here, an operation in the case where the bus error ascribable to the DMAC 2 is assumed to be transacted as one of interrupt factors will be described with reference to FIG. 3.

By way of example, it is assumed that an interrupt factor corresponding to an interrupt signal INTi is the bus error ascribable to the DMAC 2. In this case, when an interrupt is requested with the interrupt signal INTi (step STP20), the interruption controller 8 judges whether or not an interrupt enable bit corresponding to the interrupt signal INTi is enabled, through the logical gate 21 (step STP21). When the interrupt is enabled, the interruption controller 8 applies the corresponding interrupt request to the priority level arbitration circuit 22. In a case where another interrupt request is simultaneously issued on this occasion, the priority level arbitration circuit 22 arbitrates and controls the interrupt requests in accordance with predetermined priority levels so as to accept the request of relatively high priority level (step STP22). Accordingly, when the other interrupt the priority level of which is higher than that of the interrupt signal INTi is simultaneously requested, the interrupt request for the process of the bus error ascribable to the DMAC 2 is refused.

Assuming the interrupt signal INTi has passed through the priority level arbitration circuit 22, the interrupt request is applied to the compare and judge means 23 disposed in the CPU 1, and it is judged as to whether or not it is masked by the interrupt mask bit of the status register 20 (step STP23). In a case where the interrupt request is judged to be masked, namely, where the other interrupt or the like at the priority level higher than that of the interrupt signal INTi has already been accepted, the interrupt request for the transaction of the bus error ascribable to the DMAC is refused.

In a case where the judged result of the step STP23 indicates that the interrupt mask bit corresponding to the interrupt signal INTi is disabled, the pertinent interrupt request is applied to the execution unit 24 of the CPU 1, whereby the interrupt request for the bus error process attributed to the DMAC 2 is accepted by the CPU 1 for the first time (step STP24).

Upon the acceptance of the interrupt request, the CPU 1 interrupts the execution of its main flow and stores the states of the program counter and the status register 20 (Step STP25). Subsequently, it alters and sets the interrupt mask bits of the status register 20 so as not to accept new interrupt requests having priority levels lower than that of the pertinent interrupt request (step STP26). Then, it vectors the start address of a service program corresponding to the accepted interrupt request (step STP27) and runs the program to start an interrupt process for the bus error of the DMAC 2 (step STP28). After the end of the run of the service program, the operation of the CPU 1 is returned to the main flow via restoring the states (step STP29).

Figure 3:
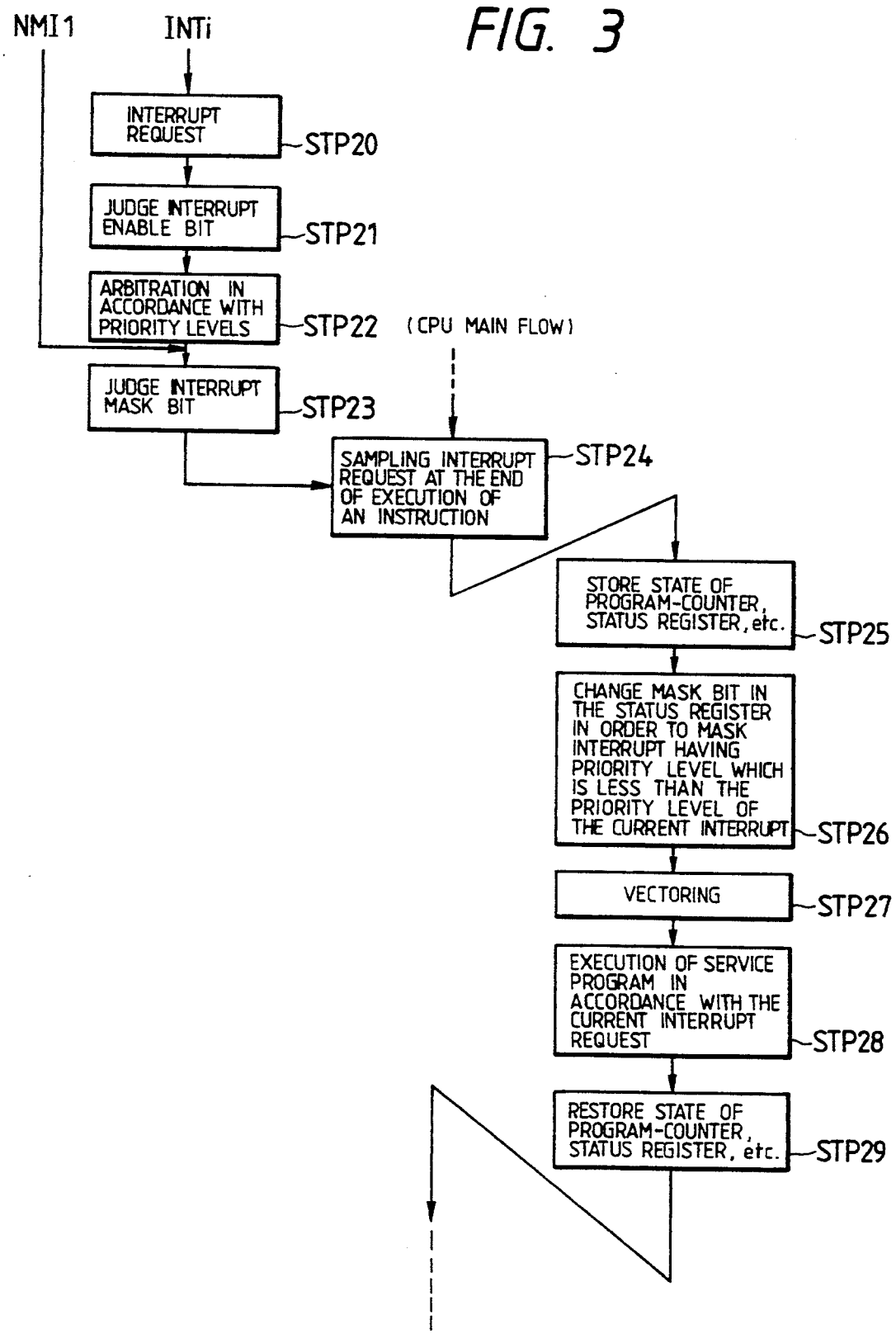
FIG. 3 is a flow chart showing an example of the operation of transacting the bus error of the DMAC at an interrupt request.

In addition, assuming that the interrupt factor corresponding to the so-called non-maskable interrupt signal NMI1 is the bus error ascribable to the DMAC 2, the decision of the enable bit at the step STP21 in FIG. 3 and the arbitration based on the priority levels at the step STP22 are not performed, but the check of the interrupt mask bit by the compare and judge means 23 is directly performed (step STP23). Likewise to interrupt requests based on other interrupt signals, even such a non-maskable interrupt request based on the interrupt signal NMI1 undergoes a process for altering and setting interrupt mask bits, similar to the foregoing (step STP26) after the step of storing the states (step STP25). Accordingly, even if the interrupt request based on the interrupt signal NMI1 is made in accordance with the bus error of the DMAC 2 during an interrupt process based on the interrupt signal NMI2 by way of example, it is refused to be accepted by the check of the interrupt mask level.

According to the present invention, the following effects are attained:

(1) A bus error ascribable to a DMAC 2 is set as the factor of an exception process specific to a CPU 1, and a request for the bus error exception process is endowed with a priority level higher than that of any interrupt request. For the exception process request, a process corresponding to the check of interrupt mask bits is not performed, and a process for altering the setting of the interrupt mask bits to be executed for the interrupt request is not performed, either, and after states have been stored, a service program corresponding to the exception process is quickly carried into run. More specifically, when the exception process request for the bus error of the DMAC 2 is issued to the CPU 1 by asserting a bus error process request signal BETREQ, the CPU 1 accepts the exception process request directly without executing processes for deciding an enable bit (step STP21), arbitrating interrupt requests on the basis of interrupt priority levels (step STP22) and checking an interrupt mask level (step STP23) as in the case of a process based on an interrupt illustrated in FIG. 3, and after storing states, it carries the service program into run quickly without executing the alteration of the setting of the interrupt mask bits (step STP26). Accordingly, even when the bus error exception process for the DMAC 2 is requested during the execution of another exception process or an interrupt process by the CPU 1, the request for the bus error exception process is not hampered by the interrupt process or the other exception process being already executed and is not refused, so that the execution of the exception process for the bus error of the DMAC 2 can be preferentially started.

(2) Owing to the above effect, a period of time which is expended since the request for the bus error exception process of the DMAC 2 till the start of the run of the service program can be made shorter than in a case where the bus error is processed by an interrupt process.

(3) Owing to the above effects, in a case where a data transfer operation by the DMAC 2 is as important as the bus cycle of the CPU 1 in point of the operation of a system, the reliability of the system operation can be enhanced in consequence of the fact that the bus error of the DMAC 2 is processed by the exception process similarly to the bus error of the CPU 1.

(4) In processing the bus error of the DMAC 2 occurring when the CPU 1 has given a bus mastership to the DMAC 2 in the course of the execution of an instruction, the CPU 1 acquires the bus mastership after the occurrence of the bus error of the DMAC 2 and executes the rest process of the instruction, and it thereafter accepts the exception process request, so that a halfway process which the CPU 1 has executed can be prevented from wasting.

(5) Since the CPU 1 and the DMAC 2 are formed on an identical semiconductor substrate and the exception process request specific to the bus error of the DMAC 2 is applied through a dedicated signal line to the dedicated terminal of the CPU 1 assigned to the pertinent request, the CPU 1 need not analyze the exception process request, thereby making it possible to more shorten the period of time which is expended until the service program for the exception process for the bus error of the DMAC 2 is carried into run.

Although, in the above, the invention made by the inventors has been concretely described in conjunction with an embodiment, it is needless to say that the present invention is not restricted to the foregoing embodiment, but that it can be variously modified within a scope not departing from the purport thereof.

By way of example, it has been described in the embodiment that a bus master module other than a CPU is a DMAC, but a bus master module different from the DMAC is similarly permitted to directly supply the CPU with an exception process request for a bus error. Incidentally, the DMAC is not restricted to a single channel, but it may well have a plurality of channels.

Besides, in the embodiment, a bus error in which an address where no peripheral circuit is mapped is output has been explained as an example. However, the bus error is not restricted thereto, but various errors of a bus cycle system, such as an error in which a peripheral circuit or a memory area where a supervisor status is set is accessed in a user status, can be processed by exception processes Further, a system for detecting the bus error is not restricted to that of the embodiment, but it can be properly altered according to the sorts of bus errors.

In addition, a system for vectoring the start address of a service program for the exception process may be any of an indirect vector designating system which employs a vector table, a system in which the bus master module such as the DMAC affords a vector directly to the CPU, and so on.

In the above, the invention made by the inventors has been chiefly described as to the case of application to a bus error transaction in a single-chip microcomputer having the built-in DMAC as forms the background field of utilization thereof. However, the present invention is not restricted to the application, but it can also be applied to a system in which bus master modules such as a CPU and a DMAC are formed on separate chips, etc. The present invention is applicable to devices each of which has, at least, the condition of transacting a bus error ascribable to a bus master module other than a CPU.

What is claimed is:

1. A data processor comprising a central processing unit having a bus mastering capability and a bus master module, both operatively connected to a bus, the bus master module including: i) means for performing a bus master operation, ii) means for detecting a bus error during a bus cycle thereof, and iii) means for providing, upon detection of the bus error, an exception process request signal to said central processing unit requesting execution of a specific exception process particular to said bus error; and, the central processing unit including: i) means for selectively relinquishing a bus master operation, ii) an interrupt terminal for receiving interrupt requests, iii) accepting means for accepting the exception process request signal into the central processing unit from the bus master module, iv) judging means for first judging interrupt mask bits in response to receiving an interrupt request on the interrupt terminal, to then process the interrupt request by executing a first predetermined interrupt service routine, v) means for substantially immediately commencing operation of a predetermined service program in direct response to receiving the exception process request signal, the operation of the predetermined service program being commenced without first executing a judging operation by said means for judging; and, vi) a dedicated terminal, different from the interrupt terminal and operatively associated with said accepting means, for receiving the exception process request signal specific to said bus error detected by the bus master module.

2. A data processor according to claim 1, wherein said bus master module includes relinquishing means for relinquishing a bus master operation when said bus error is detected in a bus cycle thereof.

3. A data processor according to claim 2, wherein said central processing unit further includes means for completing an instruction in progress before accepting the exception process request signal specific to the bus error occurring after relinquishing the bus master operation in the course of execution of the instruction in progress.

4. A data processor according to claim 1, wherein said central processing unit and said bus master module are included in a semiconductor integrated circuit formed on a single semiconductor substrate.

5. A data processor according to claim 1, wherein:
the central processing unit includes a status register for storing said interrupt mask bits;
the judging means includes setting means for setting the interrupt mask bits in response to acceptance of the interrupt request, and
the means for commencing operation of said predetermined service program includes means for commencing operation of said predetermined service program without first executing the interrupt mask bits setting.

6. A data processor according to claim 5, wherein the central processing unit and the bus master module are formed on a single semiconductor chip.

7. A data processor comprising a central processing unit and a bus master module, both connected to a system bus,
the central processing unit including:
means for selectively placing the central processing unit in data communication with said system bus,
means for executing software instructions,
an interrupt terminal means for receiving interrupt requests,
judging means for first judging interrupt mask bits in response to an interrupt request received on the interrupt terminal means, to subsequently process the interrupt request by executing an interrupt service routine,
first means for performing a bus master operation of the system bus;
means for selectively relinquishing bus master operation to a bus master module,
accepting means for accepting an exception process request signal from the bus master module,
means for completing execution of a software instruction in progress after receipt of the exception request signal,
means for commencing, after completion of the software instruction in progress, operation of a predetermined service program in accordance with the exception process request signal, the operation of the predetermined service program being substantially immediately commenced in direct response to receipt of the exception process request signal without performing a judging operation of said interrupt mask bits by said judging means, and
a dedicated terminal, different from the interrupt terminal means and operatively associated with said accepting means, for receiving the exception process request signal specific to a bus error detected by said bus master module;
the bus master module including:
second means for performing a bus master operation of the system bus;
means for detecting said bus error during a bus cycle, and
means for providing the exception process request signal upon detection of the bus error detected by the bus master module to said dedicated terminal of said central processing unit.

8. A data processor according to claim 7, wherein said bus master module includes relinquishing means for relinquishing a bus master operation when said bus error is detected in a bus cycle thereof.

9. A data processor according to claim 7, wherein said central processing unit and said bus master module are included in a semiconductor integrated circuit formed on a single semiconductor substrate.

10. A data processor according to claim 7, wherein:
the central processing unit includes a status register for storing said interrupt mask bits;
the judging means includes setting means for setting the interrupt mask bits in response to acceptance of the interrupt request, and
the means for commencing operation of said predetermined service program includes means for commencing operation of said predetermined service program without first executing the setting.

11. A data processor according to claim 10, wherein the central processing unit and the bus master module are formed on a single semiconductor chip.

12. A data processing device comprising:
a bus;
a central processing unit coupled to the bus, the central processing unit including,
an interrupt terminal for receiving an interrupt request and
a dedicated terminal, different from the interrupt terminal, for receiving an exception process request signal; and
a bus master module coupled to the bus for providing an exception process request signal directly to the central processing unit in response to reception of a bus error detection signal when the bus master module has mastership of said bus, wherein the bus master module releases the bus mastership after providing said exception process request signal, wherein the dedicated terminal receives the exception process request signal from the bus master module; and, the central processing unit including i) means for servicing an interrupt request by first referring to interrupt mask bits of a status register then performing an interrupt service routine in accordance with said interrupt mask bits and ii) means for substantially immediately executing an exception processing program according to said exception process request signal received on the dedicated terminal without first referring to said interrupt mask bits and after the central processing unit acquires the bus mastership owing to the release thereof by the bus master module.

13. A data processing device according to claim 12, further comprising:

an interruption controller coupled to the central processing unit and having a plurality of input terminals for receiving a plurality of interrupt request signals, wherein the status register includes means for storing said interrupt mask bits defining mask information indicating a priority level of an interrupt request which the central processing unit executes in response to reception of one of the plurality of interrupt request signals, wherein the central processing unit includes means for setting the interrupt mask bits in response to acceptance of the interrupt request and executing an interrupt process program, and wherein the central processing unit includes means for substantially immediately executing the exception process program without first setting the interrupt mask bits.

14. A data processing device according to claim 13, wherein the central processing unit, the bus master module and the interruption controller are formed on a single semiconductor chip.

15. A data processing device according to claim 14, further comprising:

a bus arbiter coupled to the central processing unit and to the bus master module for arbitrating the bus mastership so that a one of the central processing unit and the bus master module possesses the bus mastership, wherein the bus arbiter provides a bus acknowledge signal to the bus master module so that the bus master module gains the bus mastership, wherein the bus error detection signal is applied to the bus master module only when the bus arbiter provides the bus acknowledge signal to the bus master module.

16. A data processing device according to claim 15, wherein the bus arbiter is formed on the single semiconductor chip.

17. A data processing device according to claim 12, wherein the central processing unit includes means for executing a remaining unexecuted portion of a first instruction before the central processing unit executes the exception processing program when the central processing unit has abandoned the bus mastership in the course of the execution of the first instruction.

18. A data processing device according to claim 12, wherein the central processing unit and the bus master module are each formed on a single semiconductor chip.

19. A data processing device according to claim 12, further comprising:

a bus arbiter coupled to the central processing unit and to the bus master module for arbitrating the bus mastership so that a one of the central processing unit and the bus master module has the bus mastership, wherein the bus arbiter provides a bus acknowledge signal to the bus master module so that the bus master module gains the bus mastership, wherein the bus error detection signal is applied to the bus master module only when the bus arbiter provides the bus acknowledge signal to the bus master module.

20. A data processing device according to claim 19, wherein the central processing unit, the bus master module and the bus arbiter are formed on a single semiconductor chip.

21. A data processor device according to claim 12, wherein the central processing unit includes:

a status register storing interrupt mask bits defining mask information;

means for setting the interrupt mask bits in response to acceptance of the interrupt request; and means for substantially immediately executing the exception process without first executing the interrupt mask bits setting operation.

22. A data processor device according to claim 21, wherein the central processing unit and the bus master module are formed on a single semiconductor chip.

23. A data processing device according to claim 21, further comprising:

a bus arbiter coupled to the central processing unit and to the bus master module for arbitrating the bus mastership so that a one of the central processing unit and the bus master module possesses the bus mastership, wherein the bus arbiter provides a bus acknowledge signal to the bus master module so that the bus master module gains the bus mastership, wherein the bus error detection signal is applied to the bus master module only when the bus arbiter provides the bus acknowledge signal to the bus master module.

24. A data processor device according to claim 23, wherein the central processing unit, the bus master module and the bus arbiter are formed on a single semiconductor chip.

25. A data processing device according to claim 24, wherein the central processing unit includes means for executing a remaining unexecuted portion of a first instruction before the central processing unit executes the exception processing program when the central processing unit has abandoned the bus mastership in the course of the execution of the first instruction.

* * * * *